(12) United States Patent
Irish

(10) Patent No.: US 8,878,394 B2
(45) Date of Patent: Nov. 4, 2014

(54) WIRELESS POWER RECEIVER

(75) Inventor: Linda S. Irish, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 942 days.

(21) Appl. No.: 12/909,747

(22) Filed: Oct. 21, 2010

(65) Prior Publication Data

US 2011/0204723 A1 Aug. 25, 2011

Related U.S. Application Data

(60) Provisional application No. 61/308,246, filed on Feb. 25, 2010.

(51) Int. Cl.
*H01F 27/42* (2006.01)
*H02J 17/00* (2006.01)
*H02J 7/02* (2006.01)

(52) U.S. Cl.
CPC *H02J 17/00* (2013.01); *H02J 7/025* (2013.01)
USPC .......................................................... 307/104

(58) Field of Classification Search
USPC .......................................................... 307/104
See application file for complete search history.

(56) References Cited

U.S. PATENT DOCUMENTS

| 6,240,318 | B1 | 5/2001 | Phillips | |
|---|---|---|---|---|
| 2009/0284082 | A1* | 11/2009 | Mohammadian | 307/104 |
| 2009/0284369 | A1 | 11/2009 | Toncich et al. | |
| 2009/0286476 | A1 | 11/2009 | Toncich et al. | |
| 2010/0201201 | A1* | 8/2010 | Mobarhan et al. | 307/104 |
| 2011/0198937 | A1* | 8/2011 | Tseng | 307/104 |
| 2012/0262004 | A1* | 10/2012 | Cook et al. | 307/104 |

FOREIGN PATENT DOCUMENTS

| CN | 1208511 | A | 2/1999 |
| CN | 1289476 | A | 3/2001 |
| CN | 1293481 | A | 5/2001 |
| EP | 0891038 | A1 | 1/1999 |
| EP | 1067667 | A1 | 1/2001 |
| EP | 1096651 | A2 | 5/2001 |
| JP | 2001309580 | A | 11/2001 |
| JP | 2002152967 | A | 5/2002 |
| JP | 2009022126 | A | 1/2009 |
| TW | 200820537 | A | 5/2008 |
| TW | 200836493 | A | 9/2008 |
| TW | 200943666 | A | 10/2009 |
| WO | WO2008067542 | A2 | 6/2008 |
| WO | WO-2009140223 | | 11/2009 |

OTHER PUBLICATIONS

International Search Report and Written Opinion—PCT/US2011/024931—ISA/EPO—Jul. 30, 2012.
Taiwan Search Report—TW100106535—TIPO—Jul. 15, 2013.

* cited by examiner

*Primary Examiner* — Jared Fureman
*Assistant Examiner* — Duc M Pham
(74) *Attorney, Agent, or Firm* — Knobbe, Martens, Olson & Bear LLP

(57) ABSTRACT

Exemplary embodiments are directed to conveying wireless power received at a receive antenna to a load. A method may include coupling each terminal of the antenna to a ground voltage during a charging phase for storing energy within the antenna. The method may further include coupling at least one terminal of the antenna to an output during an output phase for transferring energy from the antenna to the output.

33 Claims, 14 Drawing Sheets

WIRELESS POWER RECEIVER

CLAIM OF PRIORITY UNDER 35 U.S.C. §119

This application claims priority under 35 U.S.C. §119(e) to:

U.S. Provisional Patent Application 61/308,246 entitled "REVERSE CLASS-D POWER RECEIVER" filed on Feb. 25, 2010, the disclosure of which is hereby incorporated by reference in its entirety.

BACKGROUND

1. Field

The present invention relates generally wireless power transfer, and more specifically, to systems, device, and methods for conveying energy from a wireless power receiver to a load.

2. Background

Approaches are being developed that use over the air power transmission between a transmitter and the device to be charged. These generally fall into two categories. One is based on the coupling of plane wave radiation (also called far-field radiation) between a transmit antenna and receive antenna on the device to be charged which collects the radiated power and rectifies it for charging the battery. Antennas are generally of resonant length in order to improve the coupling efficiency. This approach suffers from the fact that the power coupling falls off quickly with distance between the antennas. So charging over reasonable distances (e.g., >1-2 m) becomes difficult. Additionally, since the system radiates plane waves, unintentional radiation can interfere with other systems if not properly controlled through filtering.

Other approaches are based on inductive coupling between a transmit antenna embedded, for example, in a "charging" mat or surface and a receive antenna plus rectifying circuit embedded in the host device to be charged. This approach has the disadvantage that the spacing between transmit and receive antennas must be very close (e.g. mms). Though this approach does have the capability to simultaneously charge multiple devices in the same area, this area is typically small, hence the user must locate the devices to a specific area.

As will be understood by a person having ordinary skill in the art, conventional wireless power receivers may use a two-step process to supply DC power to a load. More specifically, a conventional wireless power receiver may use a rectifier along with a DC-to-DC converter to supply DC power to a load. A need exists to increase wireless power transfer. More specifically, a need exists for enhanced methods, devices, and systems for providing power from a receiver to a load.

DETAILED DESCRIPTION

The detailed description set forth below in connection with the appended drawings is intended as a description of exemplary embodiments of the present invention and is not intended to represent the only embodiments in which the present invention can be practiced. The term "exemplary" used throughout this description means "serving as an example, instance, or illustration," and should not necessarily be construed as preferred or advantageous over other exemplary embodiments. The detailed description includes specific details for the purpose of providing a thorough understanding of the exemplary embodiments of the invention. It will be apparent to those skilled in the art that the exemplary embodiments of the invention may be practiced without these specific details. In some instances, well-known structures and devices are shown in block diagram form in order to avoid obscuring the novelty of the exemplary embodiments presented herein.

The term "wireless power" is used herein to mean any form of energy associated with electric fields, magnetic fields, electromagnetic fields, or otherwise that is transmitted between a transmitter to a receiver without the use of physical electrical conductors.

Figure 1:
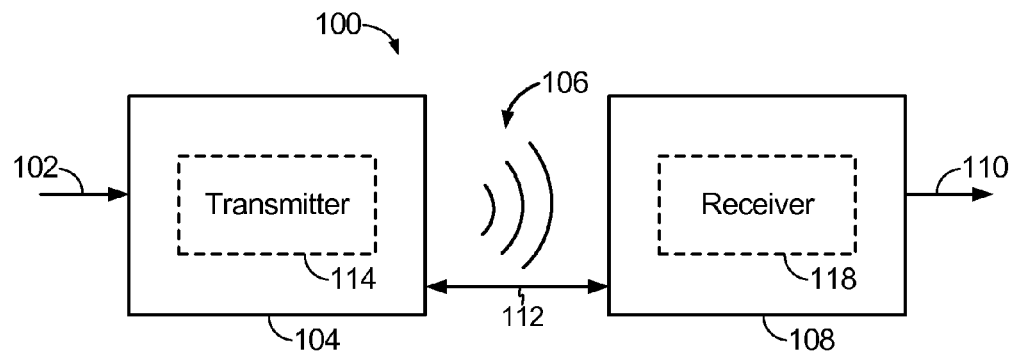
FIG. 1 shows a simplified block diagram of a wireless power transfer system.

FIG. 1 illustrates a wireless transmission or charging system 100, in accordance with various exemplary embodiments of the present invention. Input power 102 is provided to a transmitter 104 for generating a radiated field 106 for providing energy transfer. A receiver 108 couples to the radiated field 106 and generates an output power 110 for storing or consumption by a device (not shown) coupled to the output power 110. Both the transmitter 104 and the receiver 108 are separated by a distance 112. In one exemplary embodiment, transmitter 104 and receiver 108 are configured according to a mutual resonant relationship and when the resonant frequency of receiver 108 and the resonant frequency of transmitter 104 are very close, transmission losses between the transmitter 104 and the receiver 108 are minimal when the receiver 108 is located in the "near-field" of the radiated field 106.

Transmitter 104 further includes a transmit antenna 114 for providing a means for energy transmission and receiver 108 further includes a receive antenna 118 for providing a means for energy reception. The transmit and receive antennas are sized according to applications and devices to be associated therewith. As stated, an efficient energy transfer occurs by coupling a large portion of the energy in the near-field of the transmitting antenna to a receiving antenna rather than propagating most of the energy in an electromagnetic wave to the far field. When in this near-field a coupling mode may be developed between the transmit antenna 114 and the receive antenna 118. The area around the antennas 114 and 118 where this near-field coupling may occur is referred to herein as a coupling-mode region.

Figure 2:
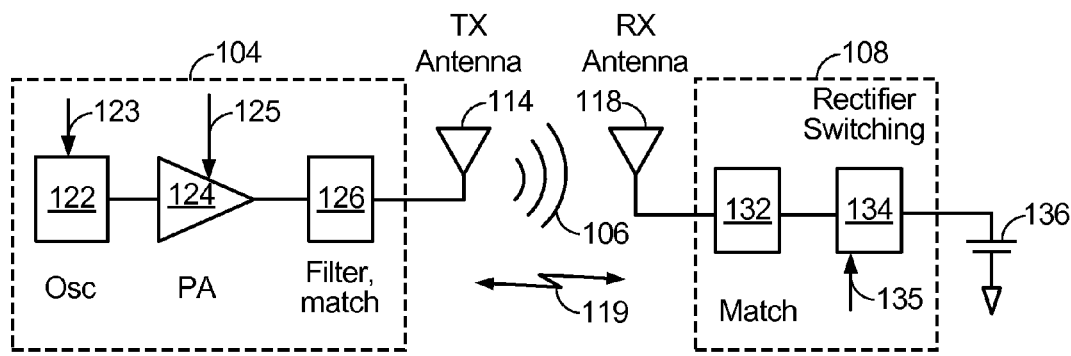
FIG. 2 shows a simplified schematic diagram of a wireless power transfer system.

FIG. 2 shows a simplified schematic diagram of a wireless power transfer system. The transmitter 104 includes an oscillator 122, a power amplifier 124 and a filter and matching circuit 126. The oscillator is configured to generate a signal at a desired frequency, which may be adjusted in response to adjustment signal 123. The oscillator signal may be amplified by the power amplifier 124 with an amplification amount responsive to control signal 125. The filter and matching circuit 126 may be included to filter out harmonics or other unwanted frequencies and match the impedance of the transmitter 104 to the transmit antenna 114.

The receiver 108 may include a matching circuit 132 and a rectifier and switching circuit 134 to generate a DC power output to charge a battery 136 as shown in FIG. 2 or power a device coupled to the receiver (not shown). The matching circuit 132 may be included to match the impedance of the receiver 108 to the receive antenna 118. The receiver 108 and transmitter 104 may communicate on a separate communication channel 119 (e.g., Bluetooth, zigbee, cellular, etc).

Figure 3:
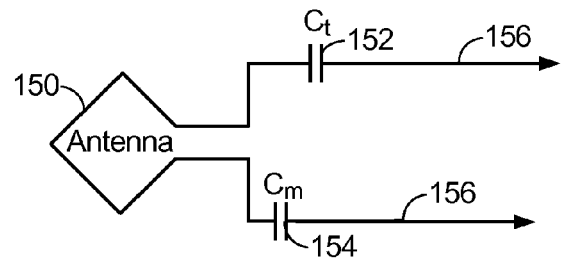
FIG. 3 illustrates a schematic diagram of a loop antenna for use in exemplary embodiments of the present invention.

As illustrated in FIG. 3, antennas used in exemplary embodiments may be configured as a "loop" antenna 150, which may also be referred to herein as a "magnetic" antenna. Loop antennas may be configured to include an air core or a physical core such as a ferrite core. Air core loop antennas may be more tolerable to extraneous physical devices placed in the vicinity of the core. Furthermore, an air core loop antenna allows the placement of other components within the core area. In addition, an air core loop may more readily enable placement of the receive antenna 118 (FIG. 2) within a plane of the transmit antenna 114 (FIG. 2) where the coupled-mode region of the transmit antenna 114 (FIG. 2) may be more powerful.

As stated, efficient transfer of energy between the transmitter 104 and receiver 108 occurs during matched or nearly matched resonance between the transmitter 104 and the receiver 108. However, even when resonance between the transmitter 104 and receiver 108 are not matched, energy may be transferred, although the efficiency may be affected. Transfer of energy occurs by coupling energy from the near-field of the transmitting antenna to the receiving antenna residing in the neighborhood where this near-field is established rather than propagating the energy from the transmitting antenna into free space.

The resonant frequency of the loop or magnetic antennas is based on the inductance and capacitance. Inductance in a loop antenna is generally simply the inductance created by the loop, whereas, capacitance is generally added to the loop antenna's inductance to create a resonant structure at a desired resonant frequency. As a non-limiting example, capacitor 152 and capacitor 154 may be added to the antenna to create a resonant circuit that generates resonant signal 156. Accordingly, for larger diameter loop antennas, the size of capacitance needed to induce resonance decreases as the diameter or inductance of the loop increases. Furthermore, as the diameter of the loop or magnetic antenna increases, the efficient energy transfer area of the near-field increases. Of course, other resonant circuits are possible. As another non-limiting example, a capacitor may be placed in parallel between the two terminals of the loop antenna. In addition, those of ordinary skill in the art will recognize that for transmit antennas the resonant signal 156 may be an input to the loop antenna 150.

Figure 4:
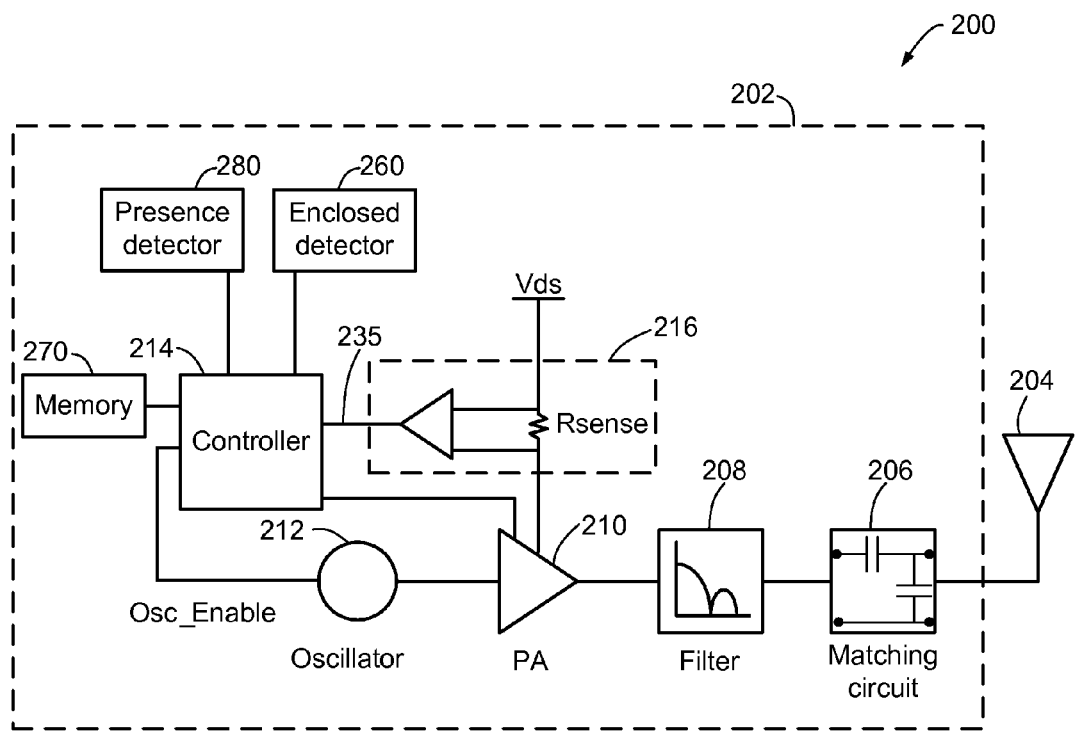
FIG. 4 is a simplified block diagram of a transmitter, in accordance with an exemplary embodiment of the present invention.

FIG. 4 is a simplified block diagram of a transmitter 200, in accordance with an exemplary embodiment of the present invention. The transmitter 200 includes transmit circuitry 202 and a transmit antenna 204. Generally, transmit circuitry 202 provides RF power to the transmit antenna 204 by providing an oscillating signal resulting in generation of near-field energy about the transmit antenna 204. It is noted that transmitter 200 may operate at any suitable frequency. By way of example, transmitter 200 may operate at the 13.56 MHz ISM band.

Exemplary transmit circuitry 202 includes a fixed impedance matching circuit 206 for matching the impedance of the transmit circuitry 202 (e.g., 50 ohms) to the transmit antenna 204 and a low pass filter (LPF) 208 configured to reduce harmonic emissions to levels to prevent self-jamming of devices coupled to receivers 108 (FIG. 1). Other exemplary embodiments may include different filter topologies, including but not limited to, notch filters that attenuate specific frequencies while passing others and may include an adaptive impedance match, that can be varied based on measurable transmit metrics, such as output power to the antenna or DC current drawn by the power amplifier. Transmit circuitry 202 further includes a power amplifier 210 configured to drive an RF signal as determined by an oscillator 212. The transmit circuitry may be comprised of discrete devices or circuits, or alternately, may be comprised of an integrated assembly. An exemplary RF power output from transmit antenna 204 may be on the order of 2.5 Watts.

Transmit circuitry 202 further includes a controller 214 for enabling the oscillator 212 during transmit phases (or duty cycles) for specific receivers, for adjusting the frequency or phase of the oscillator, and for adjusting the output power level for implementing a communication protocol for interacting with neighboring devices through their attached receivers. As is well known in the art, adjustment of oscillator phase and related circuitry in the transmission path allows for reduction of out of band emissions, especially when transitioning from one frequency to another.

The transmit circuitry 202 may further include a load sensing circuit 216 for detecting the presence or absence of active receivers in the vicinity of the near-field generated by transmit antenna 204. By way of example, a load sensing circuit 216 monitors the current flowing to the power amplifier 210, which is affected by the presence or absence of active receivers in the vicinity of the near-field generated by transmit antenna 204. Detection of changes to the loading on the power amplifier 210 are monitored by controller 214 for use in determining whether to enable the oscillator 212 for transmitting energy and to communicate with an active receiver.

Transmit antenna 204 may be implemented with a Litz wire or as an antenna strip with the thickness, width and metal type selected to keep resistive losses low. In a conventional implementation, the transmit antenna 204 can generally be configured for association with a larger structure such as a table, mat, lamp or other less portable configuration. Accordingly, the transmit antenna 204 generally will not need "turns" in order to be of a practical dimension. An exemplary implementation of a transmit antenna 204 may be "electrically small" (i.e., fraction of the wavelength) and tuned to resonate at lower usable frequencies by using capacitors to define the resonant frequency. In an exemplary application where the transmit antenna 204 may be larger in diameter, or length of side if a square loop, (e.g., 0.50 meters) relative to the receive antenna, the transmit antenna 204 will not necessarily need a large number of turns to obtain a reasonable capacitance.

The transmitter 200 may gather and track information about the whereabouts and status of receiver devices that may be associated with the transmitter 200. Thus, the transmitter circuitry 202 may include a presence detector 280, an enclosed detector 290, or a combination thereof, connected to the controller 214 (also referred to as a processor herein). The controller 214 may adjust an amount of power delivered by the amplifier 210 in response to presence signals from the presence detector 280 and the enclosed detector 290. The transmitter may receive power through a number of power sources, such as, for example, an AC-DC converter (not shown) to convert conventional AC power present in a building, a DC-DC converter (not shown) to convert a conventional DC power source to a voltage suitable for the transmitter 200, or directly from a conventional DC power source (not shown).

Figure 5:
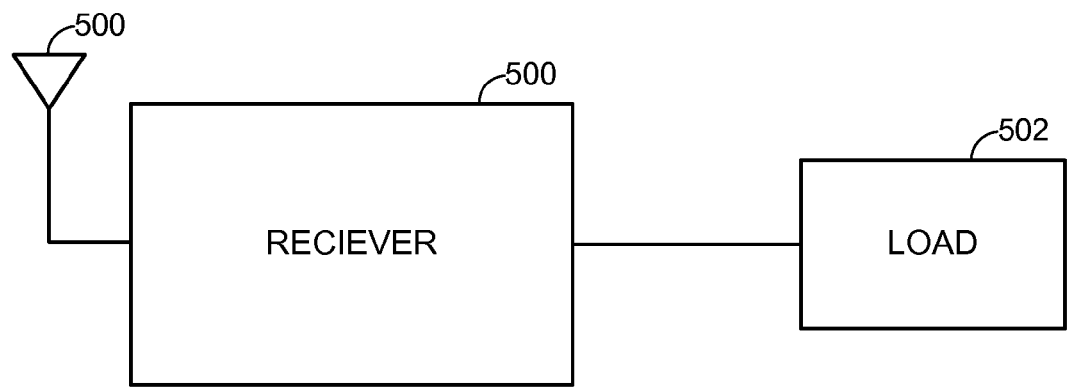
FIG. 5 illustrates a simplified block diagram of an electronic device including a receiver, in accordance with an exemplary embodiment of the present invention.

Various exemplary embodiments of the present invention, as described herein, relate to systems, devices, and methods for conveying energy from a wireless power receiver to a load, such as a battery. FIG. 5 illustrates a block diagram of an electronic device 400 including a receiver 500 operably coupled to a receive antenna 504, according to an exemplary embodiment of the present invention. As illustrated in FIG. 5, receiver 500 may be coupled to a load 502, which may comprise, for example, a battery. More specifically, as an example, load may comprise a battery of an electric device, such as a camera, a mobile telephone, or an electric vehicle. As described herein, receiver 500 may wirelessly receive energy from an associated transmitter via transmit antenna 504 and, in receipt thereof, may convey a rectified DC voltage to load 502, which may comprise, for example only, a battery. A receive antenna of receiver 500 may be tuned to resonate at the same frequency, or near the same frequency, as a transmit antenna (e.g., transmit antenna 204 of FIG. 4). It is noted that receiver 500 is frequency independent and may operate at any suitable frequency, such as, for example only, 13.56 MHz or 6.78 MHz. It is further noted that receiver 500 may operate at lower frequencies, such as frequencies suitable for induction or electric vehicle applications. Furthermore, receiver 500 may be configured to be used within loosely or tightly (i.e., inductive) coupled systems.

Figure 6:
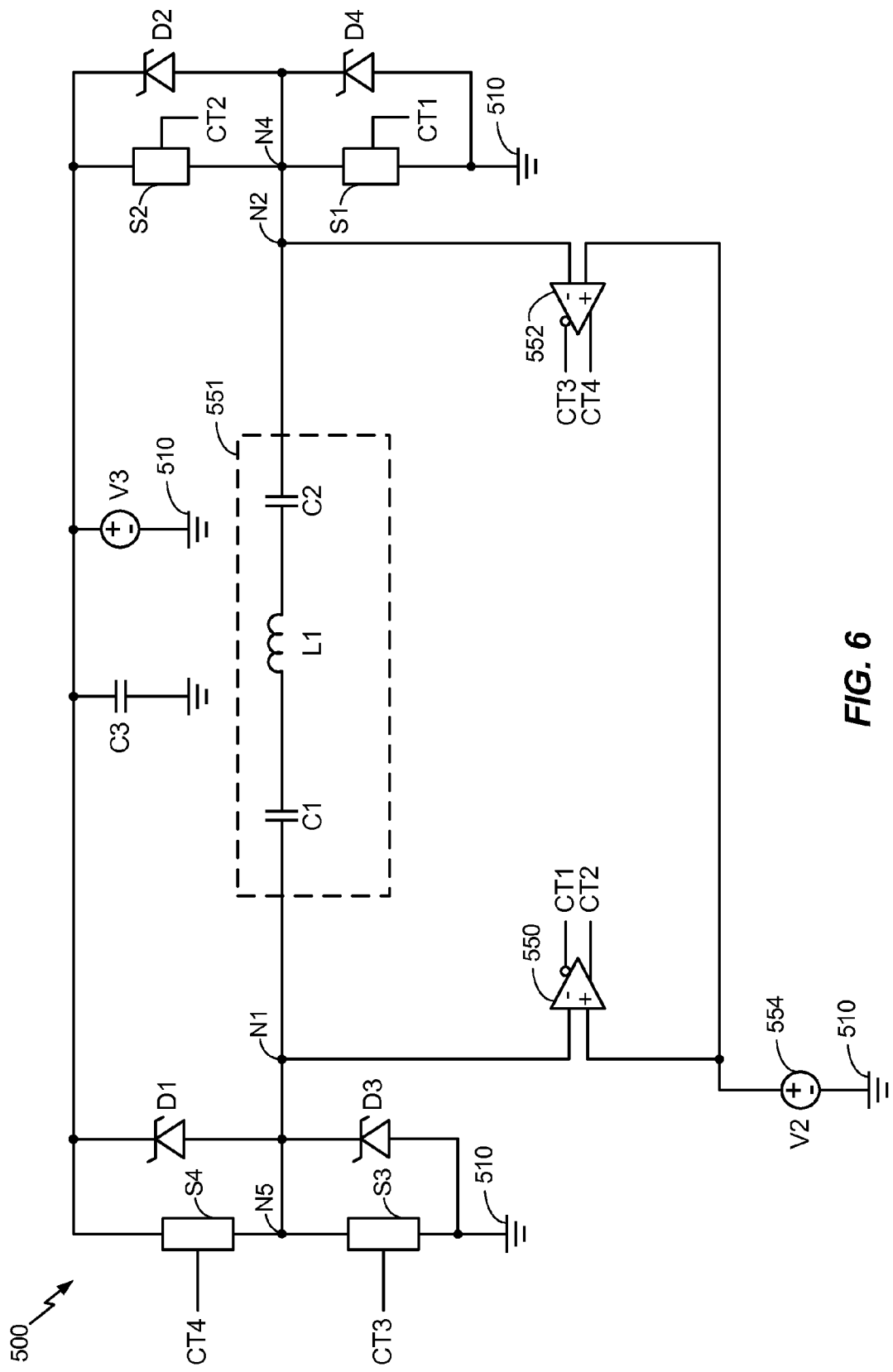
FIG. 6 is a circuit diagram of a receiver, in accordance with an exemplary embodiment of the present invention.

FIG. 6 illustrates a circuit diagram of receiver 500, in accordance with an exemplary embodiment of the present invention. Receiver 500 includes an inductor L1 coupled between a capacitor C1 and a capacitor C2. According to one exemplary embodiment, inductor L1 along with capacitors C1 and C2, which comprise matching capacitors, may comprise a receive antenna 551. It is noted that capacitors C1 and C2, which may comprise any suitable value, may determine a resonant frequency of the receive antenna. Moreover, inductor L1 may comprise, for example only, a one-turn loop. Receiver 500 further includes a node N1, which is coupled between one side of capacitor C1 and a node N5, and a node N2, which is coupled between one side of capacitor C2 and a node N4.

Receiver 500 further includes a first current sense comparator 550 and a second current sense comparator 552. As illustrated, a first input of first current sense comparator 550 is coupled to node N1 and, therefore, is configured to sense a current through node N1. A second input of first current sense comparator 550 is coupled to an input 554, which is configured to supply a threshold current. Furthermore, a first input of second current sense comparator 552 is coupled to node N2 and, therefore, is configured to sense a current through node N2. A second input of second current sense comparator 552 is coupled to input 554, which, as noted above, is configured to supply a threshold current. As will be appreciated by a person having ordinary skill in the art, first current sense comparator 550 may compare the current through node N1 to a current generated by input 554 and, in response thereto, may generate one or more control signals (e.g. control signal CT1 and control signal CT2). Furthermore, second current sense comparator 552 may compare the current through node N2 to a current generated by input 554 and, in response thereto, may generate one or more control signals (e.g. control signal CT3 and control signal CT4).

Receiver 500 further includes a first switching element S1, a second switching element S2, a third switching element S3, and a fourth switching element S4. It is noted that switching elements S1, S2, S3, and S4 may comprise any suitable and known switching elements. With reference again to FIG. 6, receiver 500 may also includes diodes D1-D4, a capacitor C3, and an output voltage V3. As will be appreciated by a person having ordinary skill in the art, diodes D1-D4 may comprise protective diodes, wherein each diode D1-D4 is associated with a switching element (e.g., diode D1 is a protective diode associated with switching element S4).

Figure 7:
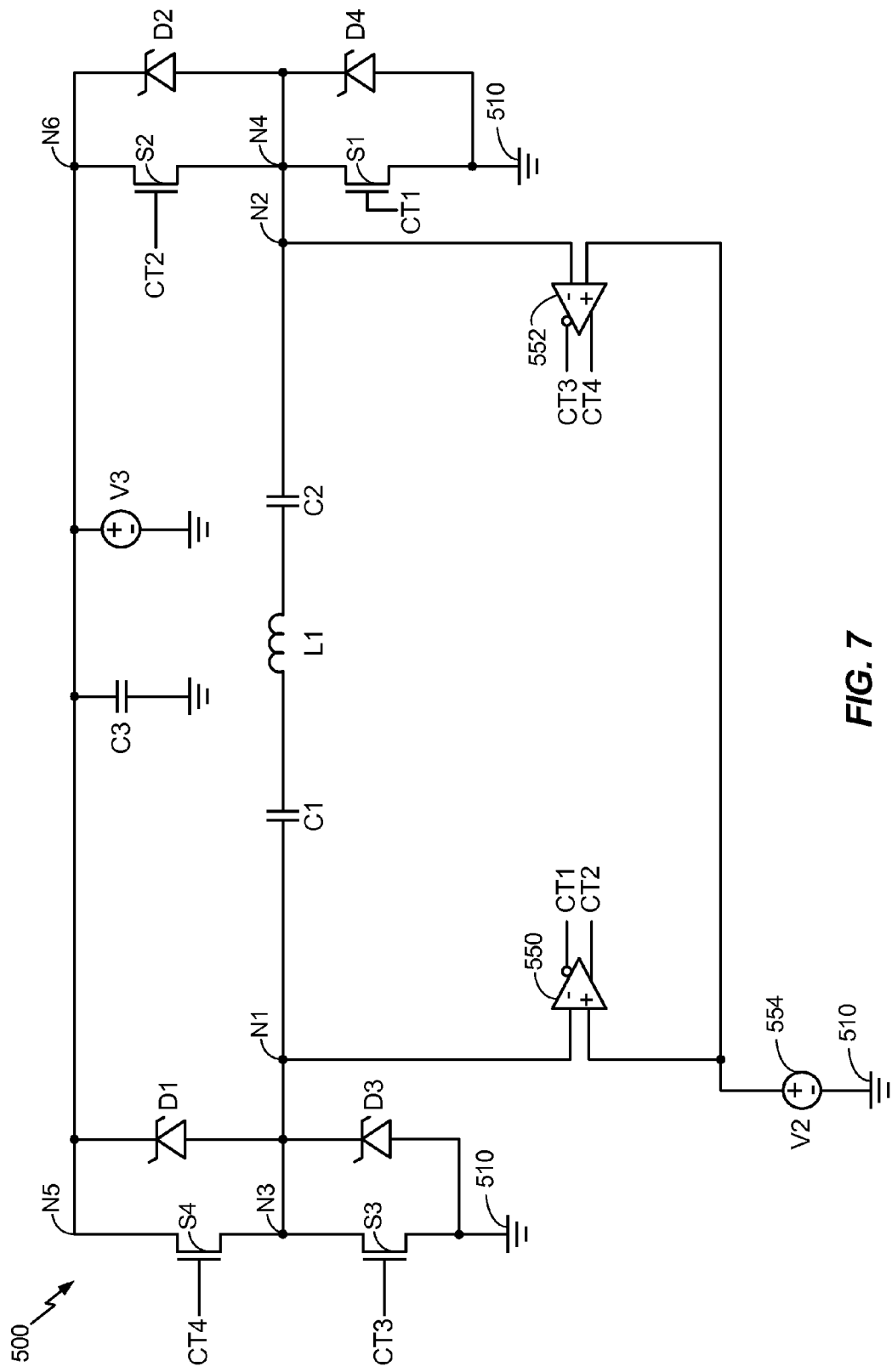
FIG. 7 a circuit diagram of a receiver including a plurality of transistors, in accordance with an exemplary embodiment of the present invention.

By way of example only, with reference to FIG. 7, switching elements S1, S2, S3, and S4 each comprises a transistor. In the exemplary embodiment illustrated in FIG. 7, switching element S1 has a gate coupled to control signal CT1, a drain coupled to node N4 and a source coupled to a ground voltage 510. Switching element S2 has a gate coupled to control signal CT2, a drain coupled to a node N6 and a source coupled to node N4. Switching element S3 has a gate coupled to control signal CT3, a drain coupled to a node N3, and a source coupled to ground voltage 510. Furthermore, switching element S4 has a gate coupled to control signal CT4, a drain coupled to a node N5 and a source coupled to node N3. As noted above and, as described more fully below, in response to comparing currents at associated inputs, first current sense comparator 550 may generate control signals to controls the operation of switching elements S1 and S2. Similarly, in response to comparing currents at associated inputs, second current sense comparator 552 may generate control signals to controls the operation of switching elements S3 and S4.

Figure 8A:
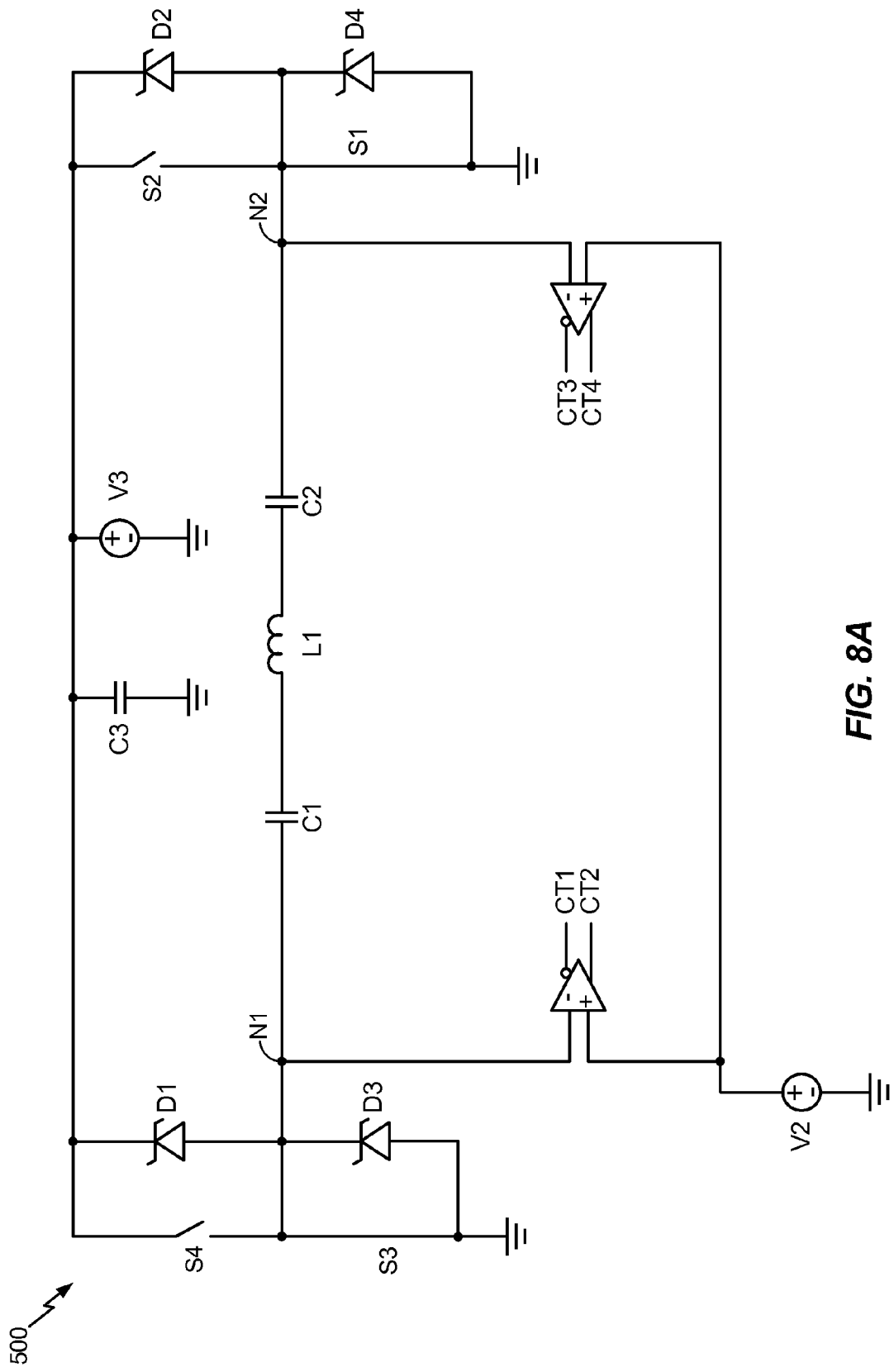
FIG. 8A is circuit diagram of a receiver in one configuration, in accordance with an exemplary embodiment of the present invention.
Figure 8B:
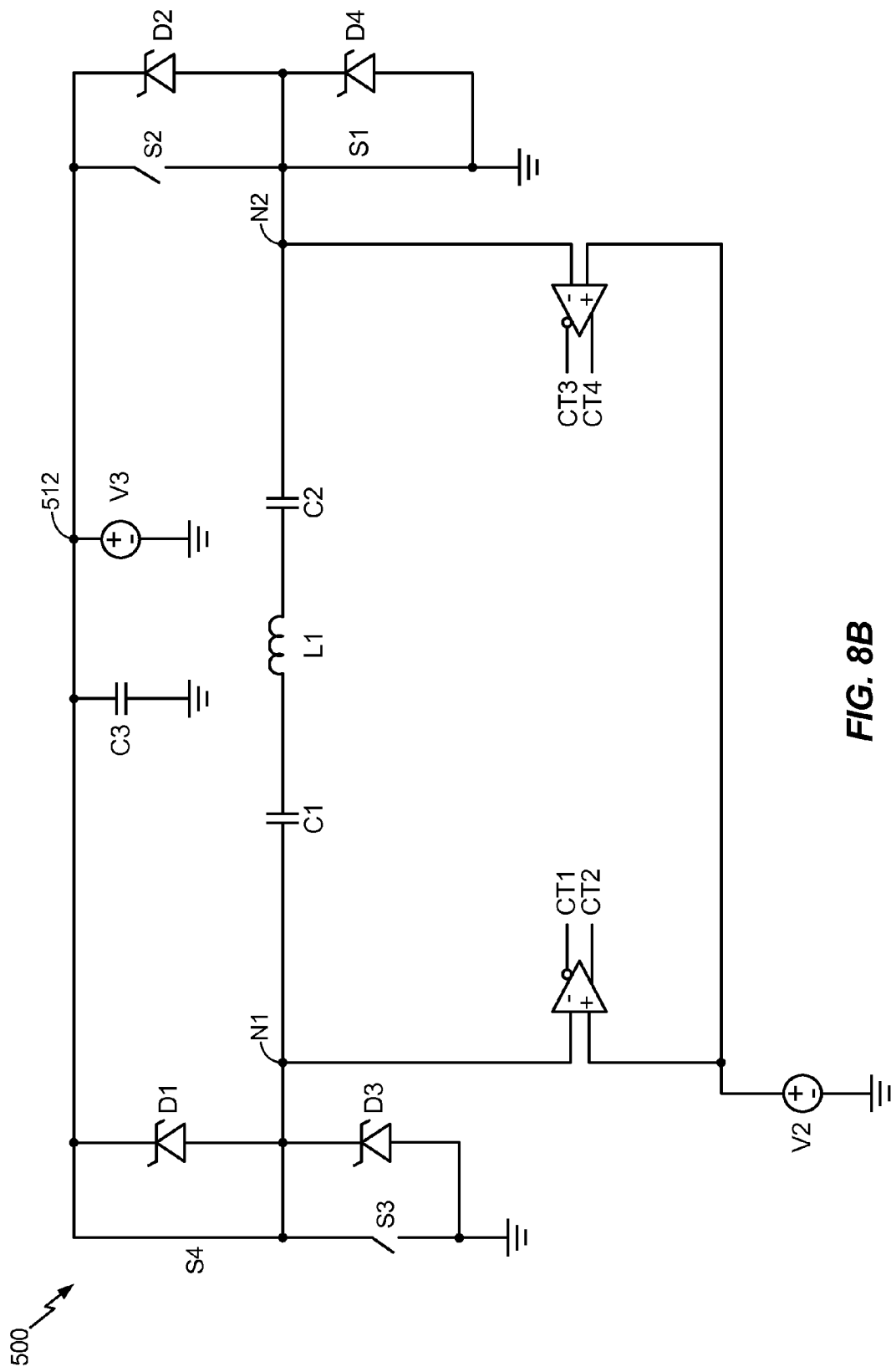
FIG. 8B is circuit diagram of the receiver of FIG. 8A in another configuration, in accordance with an exemplary embodiment of the present invention.
Figure 8C:
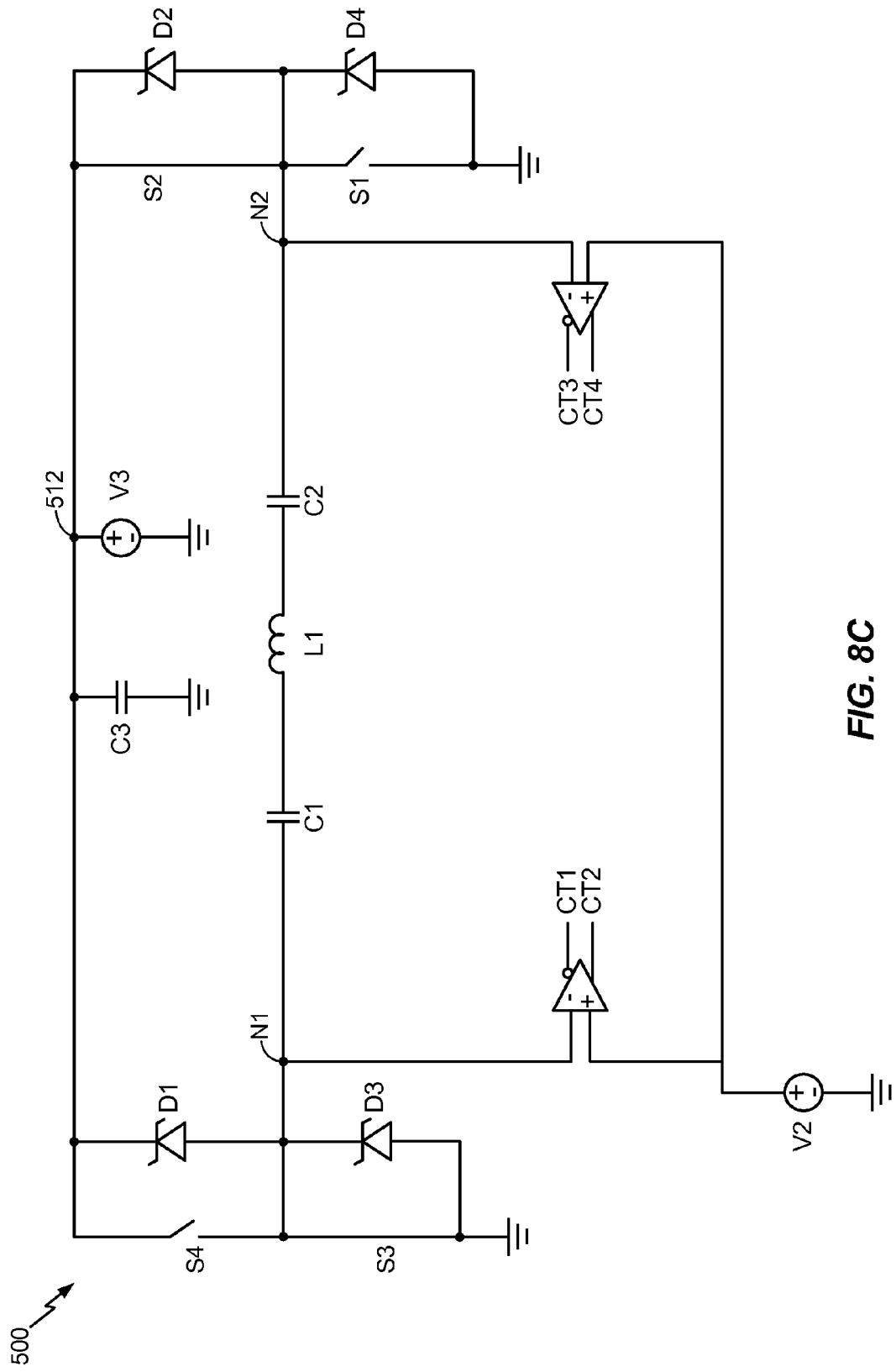
FIG. 8C is circuit diagram of the receiver of FIG. 8A in yet another configuration, in accordance with an exemplary embodiment of the present invention.

FIG. 8A illustrates receiver 500 in a configuration wherein switching elements S1 and S3 are closed and switching elements S2 and S4 are open. As will be appreciated by a person having ordinary skill in the art, while receiver 500 is in the configuration illustrated in FIG. 8A, each terminal of receive antenna 551 (i.e., wherein node N1 is a first, positive terminal of receive antenna 551 and node N2 is a second, negative terminal of receive antenna 551) is coupled to ground voltage 510. Accordingly, in this configuration, a current through each of node N1 and node N2 may increase. FIG. 8B illustrates receiver 500 in a configuration wherein switching elements S1 and S4 are closed and switching elements S2 and S3 are open. As will be appreciated by a person having ordinary skill in the art, the configuration illustrated in FIG. 8B enables a current, which is flowing from node N2 to node 1, to flow to output 512. FIG. 8C illustrates receiver 500 in a configuration wherein switching elements S3 and S2 are closed and switching elements S1 and S4 are open. As will be appreciated by a person having ordinary skill in the art, the configuration illustrated in FIG. 8C enables a current, which is flowing from node N1 to node N2, to flow to output 512.

Figure 9:
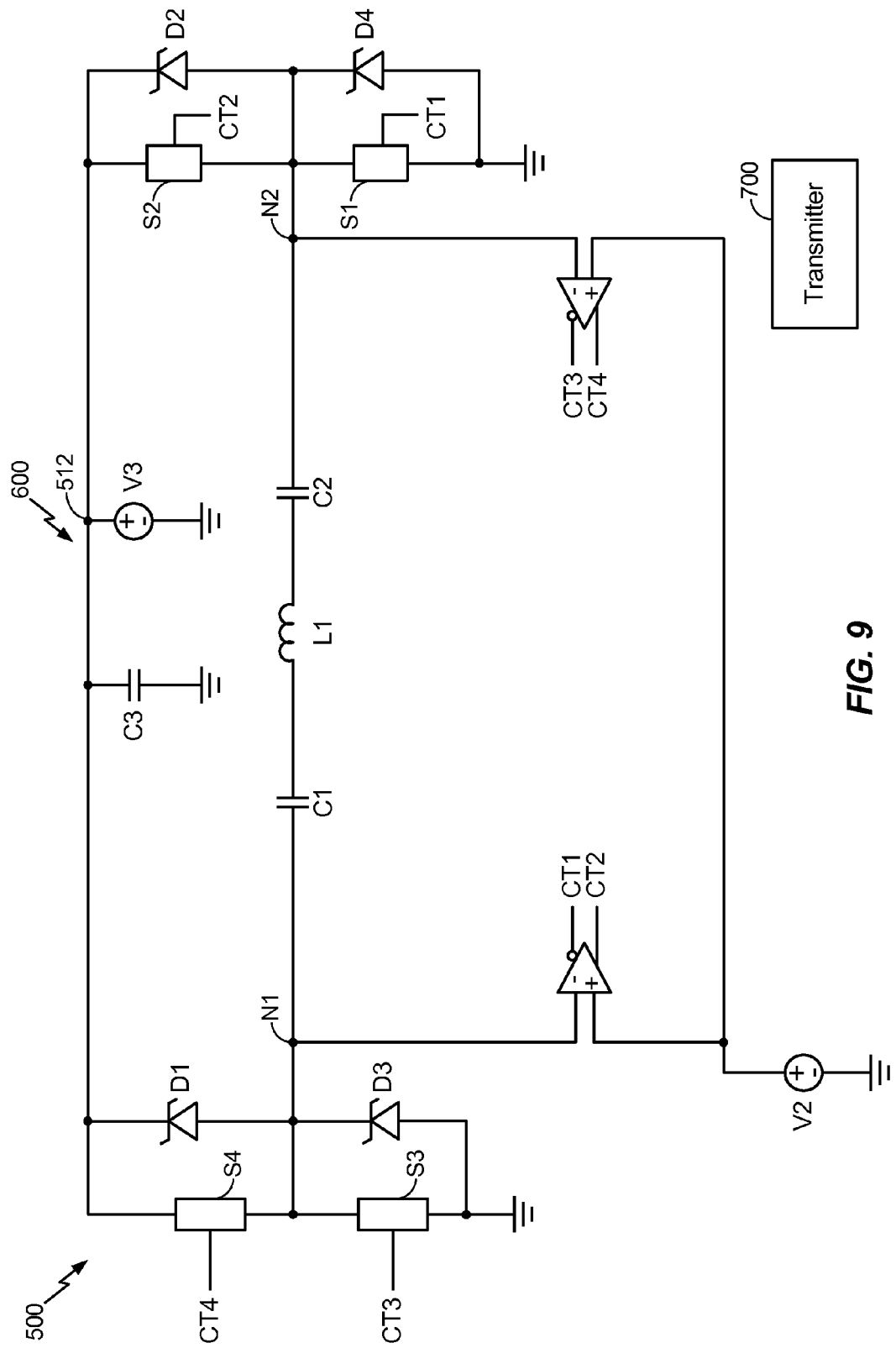
FIG. 9 illustrates a system including a transmitter and a receiver, in accordance with an exemplary embodiment of the present invention.

FIG. 9 illustrates a circuit diagram of a system 600 including receiver 500 and a transmitter 602, according to an exemplary embodiment of the present invention. According to an exemplary embodiment of the present invention, energy wirelessly transmitted by transmitter 602 may be received by inductor L1. Furthermore, according to one or more of the exemplary embodiments described herein, receiver 500 may convey DC power to output 512, which may be coupled to a load (e.g., a chargeable battery of an electronic device). As noted above, load may comprise, for example only, a battery of an electric device, such as a camera, a mobile telephone, or an electric vehicle.

Figure 10:
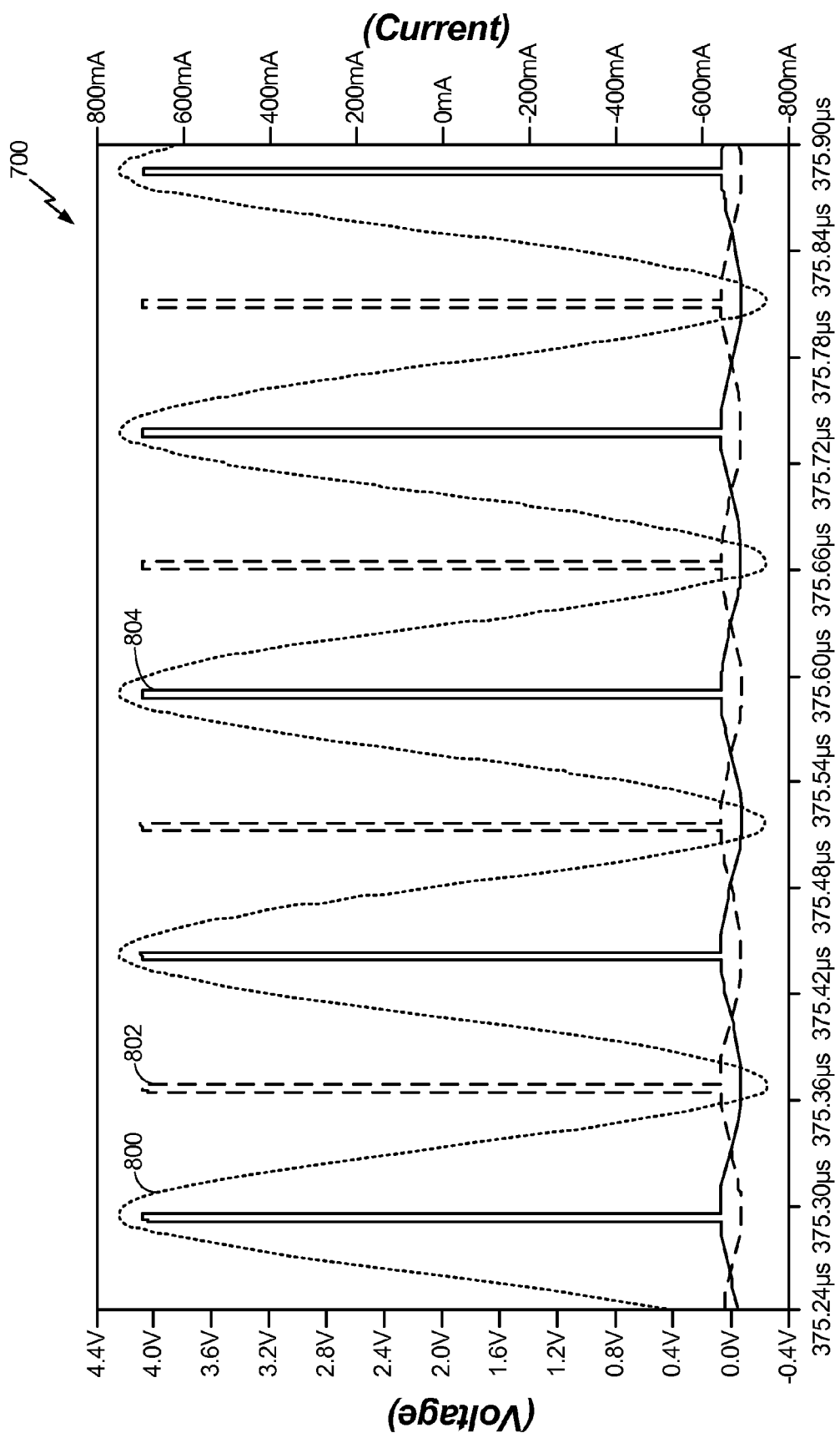
FIG. 10 is a plot illustrating various signals associated with a receiver, according to an exemplary embodiment of the present invention.
Figure 11:
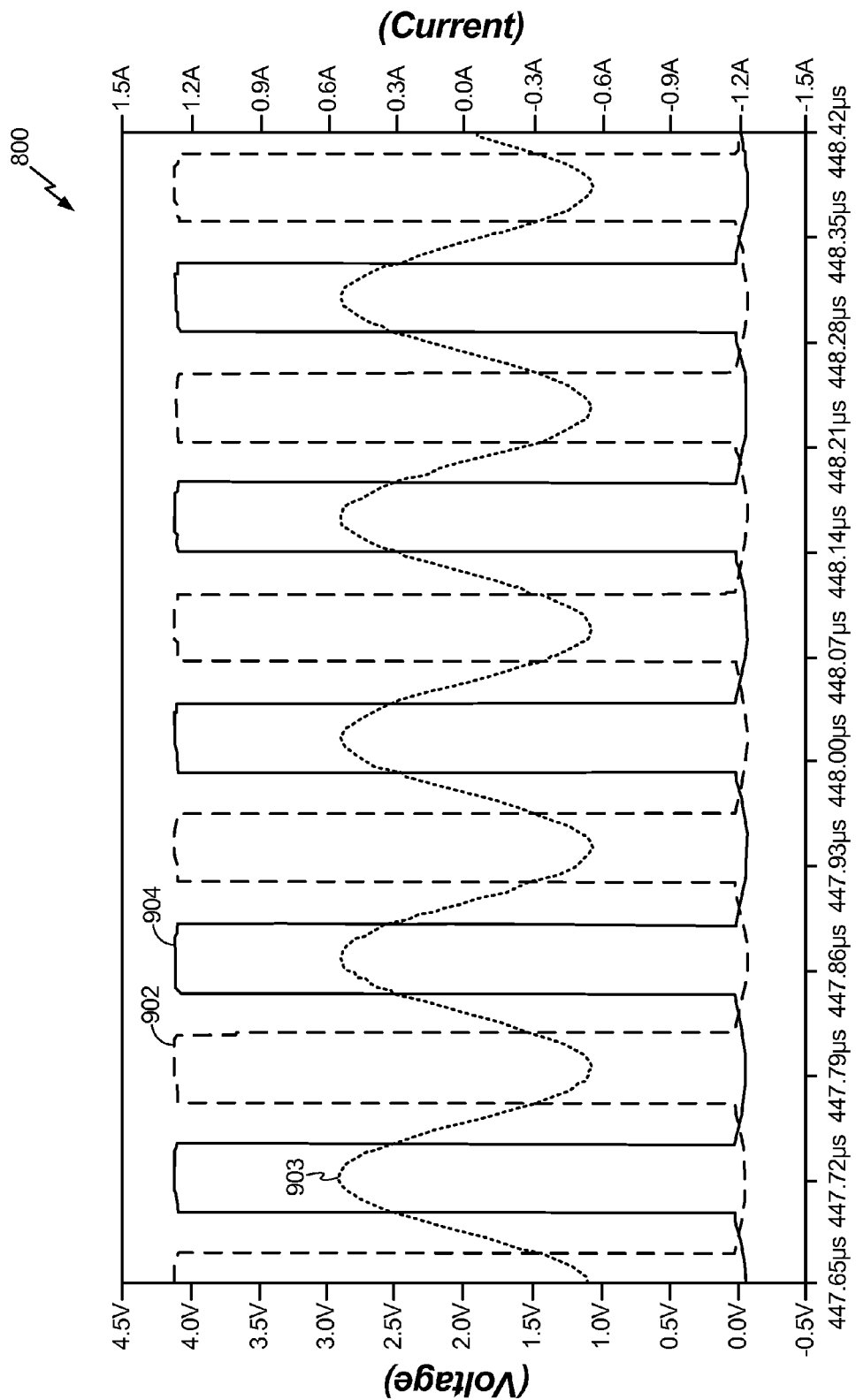
FIG. 11 is another plot illustrating various signals associated with a receiver, according to an exemplary embodiment of the present invention.
Figure 12:
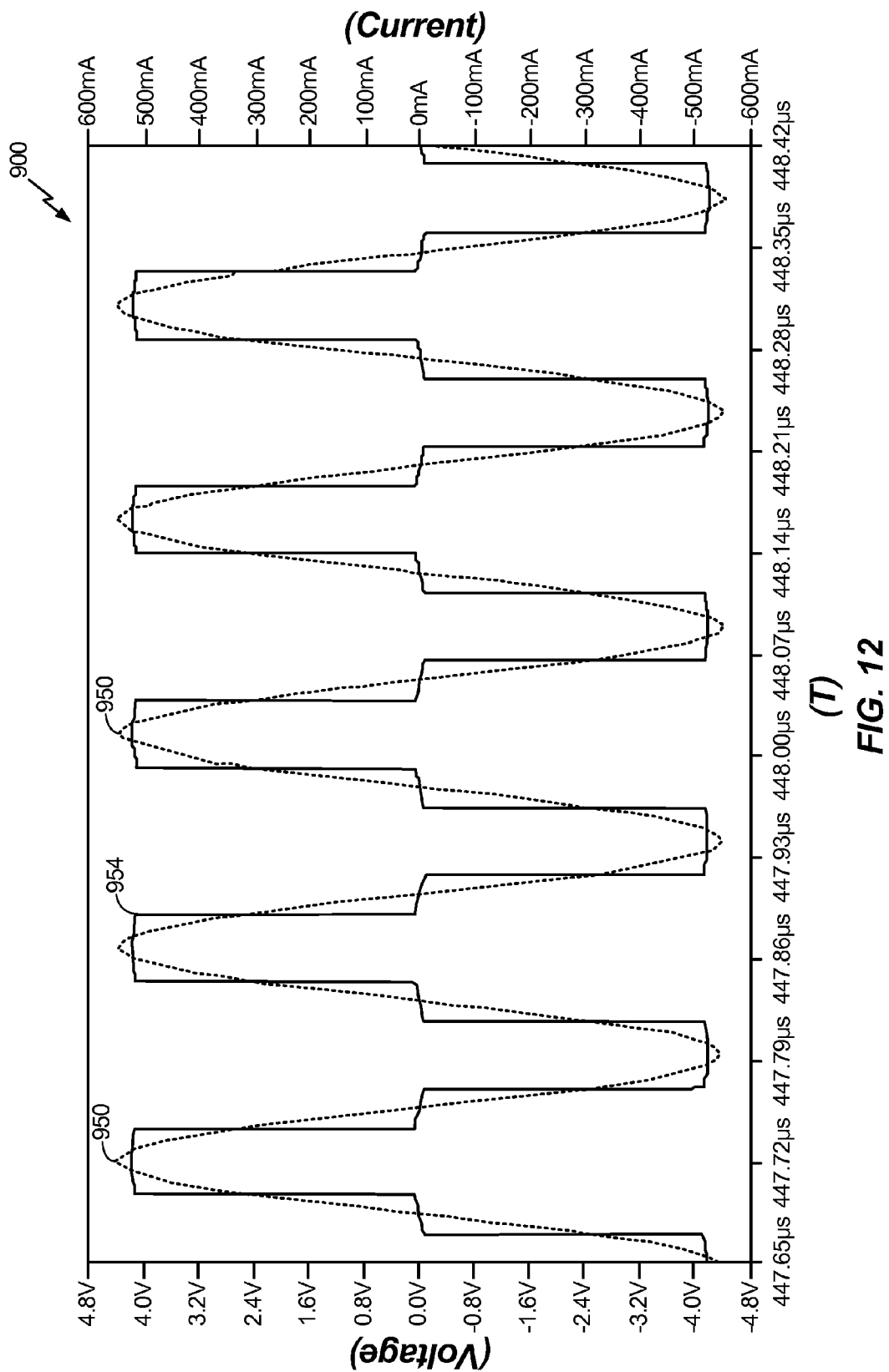
FIG. 12 is yet another plot illustrating various signals associated with a receiver, according to an exemplary embodiment of the present invention.

FIGS. 10-12 respectively illustrate plots 700, 800, and 900 depicting various signals associated with receiver 500 (see FIG. 6) with respect to a time T. With reference to FIGS. 6 and 10, a signal 800 represents a current through inductor L1 with respect to time T. A signal 802 represents a voltage at node N1 with respect to time T and a signal 804 represents a voltage at node N2 with respect to time T. As illustrated in FIG. 10, signal 802 and signal 804 each periodically spike from approximately 0.0 volts to approximately 4.0 volts. The voltage spikes of signal 802, which represents the voltage at node N1, are caused by opening switching element S1 and closing switching element S2. Similarly, the voltage spikes of signal 804, which represents the voltage at node N2, are caused by opening switching element S3 and closing switching element S4.

With reference to FIGS. 6 and 11, a signal 903 represents a current through inductor L1 with respect to time T. A signal 902 represents a voltage at node N1 with respect to time T and a signal 904 represents a voltage at node N2 with respect to time T. As illustrated in FIG. 11, signal 902 and signal 904 each periodically spike from approximately 0.0 volts to approximately 4.0 volts. The voltage spikes of signal 902, which represents the voltage at node N1, are caused by opening switching element S1 and closing switching element S2. Similarly, the voltage spikes of signal 904, which represents the voltage at node N2, are caused by opening switching element S3 and closing switching element S4. It is noted that in FIG. 11, a value of a current through inductor L1 (i.e., signal 903) is smaller that a value of a current through inductor L1, as illustrated in FIG. 10 (i.e., signal 800), because a greater amount of energy is released in the embodiment illustrated in FIG. 11. Stated another way, the width of the pulses of signals 902 and 904 in the plot of FIG. 11 are wider than the pulses of signals 802 and 804 in the plot of FIG. 10 due to a greater amount of energy being released, which results in the current through inductor L1 being smaller.

With reference to FIGS. 6 and 12, a signal 950 represents a current through inductor L1 with respect to time T. Further, a signal 954 represents a voltage across inductor L1 (i.e., the voltage at node N2—the voltage at node N1).

With reference to FIGS. 6-12, a contemplated operation of receiver 500 will now be described. Initially, input 554 generates threshold voltage V2, which in turn produces a threshold current that may be sensed by each of first current sense comparator 550 and second current sense comparator 552. Furthermore, switching element S1 and switching element S3 are initially closed, switching elements S2 and S4 are open and, therefore, upon receipt of energy at inductor L1, a current, which, for example, may flow from node N1 to node N2, begins to increase. This configuration may be referred to as a charging phase. Upon a current at node N1 becoming greater than the threshold current supplied to first current sense comparator 550, first current sense comparator 550 may generate control signals CT1 and CT2, which in turn, respectively opens switching element S1 and closes switching element S2. It is noted that, according to one exemplary embodiment, a voltage drop across switching element S1, which may comprise a MOSFET, may be measured to determine when a current at node N1 is at a sufficient level to open switch S1 and close switch S2. With specific reference to FIGS. 6, 10 and 11, opening switching element S1 and closing switching element S2 may generate a spike in signal 804, which represents the voltage at node N2. Upon switching element S1 opening and switching element S2 closing, a current, which is flowing from node N1 to node N2, may flow into output 512. This configuration may be referred to as an output phase.

Thereafter, switching element S1 may be closed and switching element S2 may be opened. Accordingly, switching element S1 and switching element S3 are again closed, switching elements S2 and S4 are open and, therefore, upon receipt of energy at inductor L1, a current, which, for example, may flow from node N2 to node N1, begins to increase. This configuration may be referred to as a charging phase. Upon a current at node N2 becoming greater than the threshold current supplied to second current sense comparator 552, second current sense comparator 552 may generate control signals CT3 and CT4, which in turn, respectively opens switching element S3 and closes switching element S4. It is noted that, according to one exemplary embodiment, a voltage drop across switching element S3, which may comprise a MOSFET, may be measured to determine when a current at node N2 is at a sufficient level to open switch S3 and close switch S4. With specific reference to FIGS. 6, 10 and 11, opening switching element S3 and closing switching element S4 may generate a spike in signal 802, which represents the voltage at node N1. Upon switching element S3 opening and switching element S4 closing, a current, which is flowing from node N2 to node N1, may flow into output 512. This configuration may be referred to as an output phase.

It is noted that, according to one exemplary embodiment, a current waveform in the antenna may be in phase with the voltage waveform. By way of example only, a phase locked loop or delay locked loop can be used to align the current and voltage waveform. Furthermore, with specific reference to FIGS. 10 and 11, the width of the pulses of signals 802 and 804 may determine the magnitude of the load impedance of receiver 500. Moreover, the phase relationship between the pulses (i.e., the pulses of signals 802 and 804) and the current (i.e., signal 800) may be indicative of whether the circuit (i.e., the circuit of FIG. 6) acts resistive, capacitive or inductive at the resonant frequency. Although it may be advantageous for the circuit to act resistive, there may be some advantage to making the circuit act inductive or capacitive to adjust for less than optimal tuning.

Figure 13:
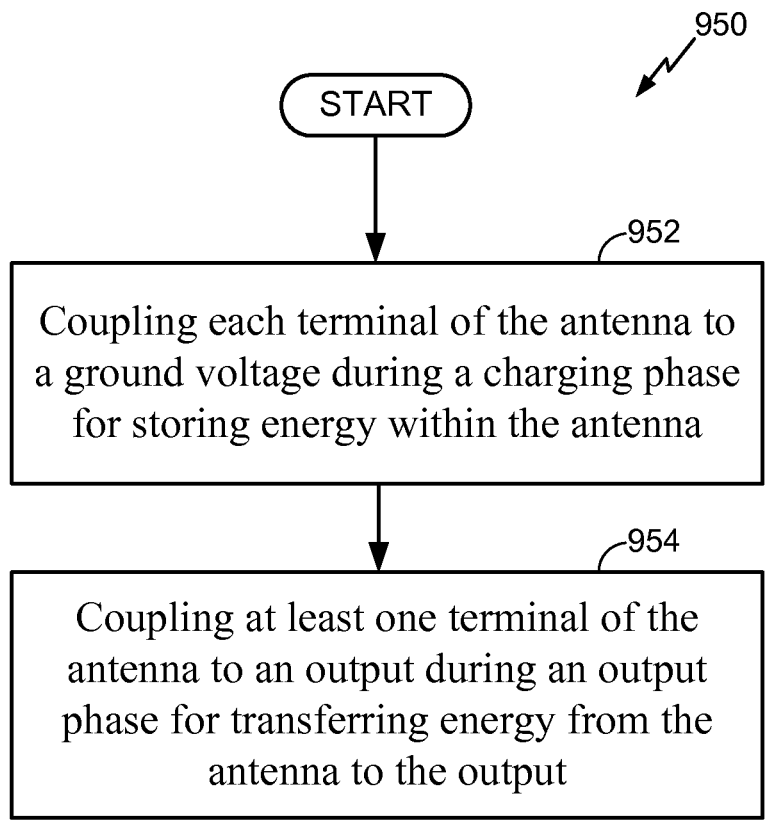
FIG. 13 is a flowchart illustrating a method, in accordance with an exemplary embodiment of the present invention.

FIG. 13 is a flowchart illustrating another method 950, in accordance with one or more exemplary embodiments. Method 950 may include coupling each terminal of the antenna to a ground voltage during a charging phase for storing energy within the antenna (depicted by numeral 952). Additionally, method 950 may include coupling at least one terminal of the antenna to an output during an output phase for transferring energy from the antenna to the output (depicted by numeral 954).

Figure 14:
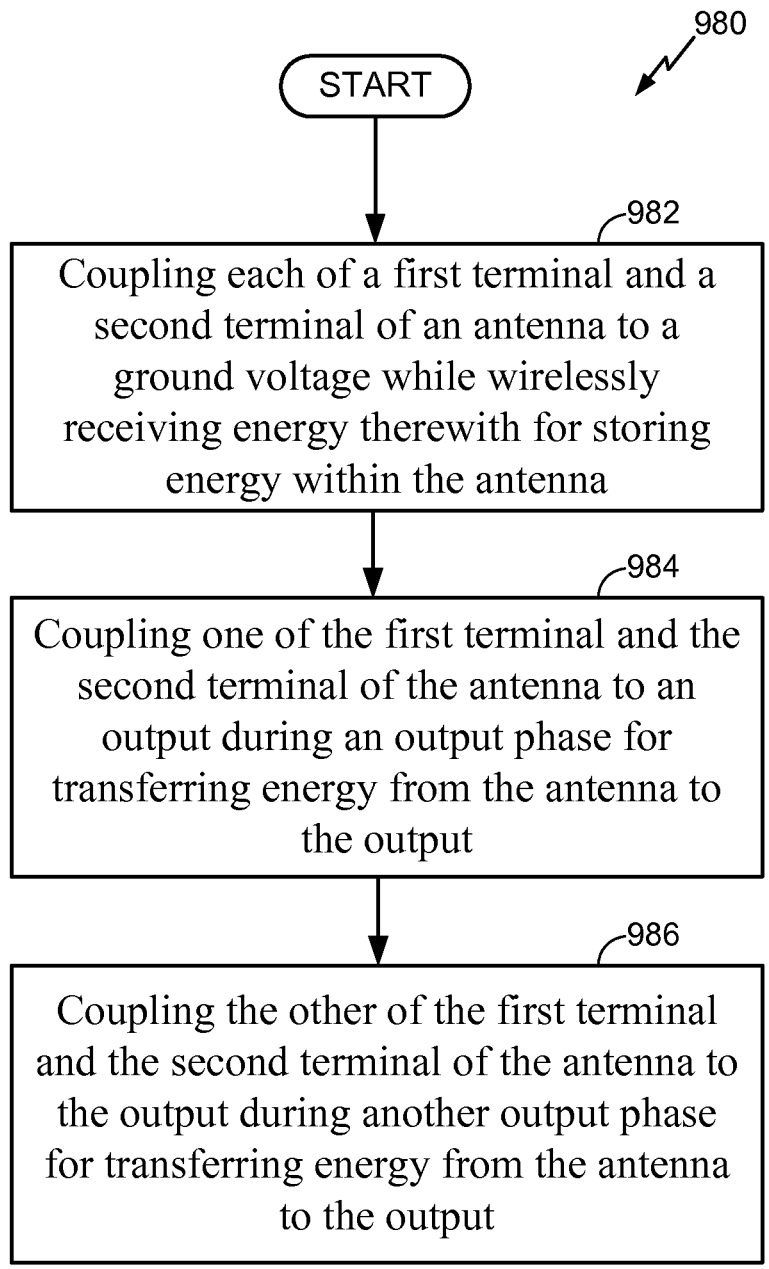
FIG. 14 is a flowchart illustrating another method, in accordance with an exemplary embodiment of the present invention.

FIG. 14 is a flowchart illustrating another method 980, in accordance with one or more exemplary embodiments. Method 980 may include coupling each of a first terminal and a second terminal of an antenna to a ground voltage while wirelessly receiving energy therewith for storing energy within the antenna (depicted by numeral 982). Method 980 may further include coupling one of the first terminal and the second terminal of the antenna to an output during an output phase for transferring energy from the antenna to the output (depicted by numeral 984). Further, method 980 may include coupling the other of the first terminal and the second terminal of the antenna to the output during another output phase for transferring energy from the antenna to the output (depicted by numeral 986).

The exemplary embodiments of the invention described herein may reduce or possibly eliminate the need for a buck or a boost voltage regulator and the associated components. Therefore, board area, BOM costs, and the number of power conversion stages, may be reduced. Furthermore, the reduction in power conversion stages may increase efficiency. Accordingly, embodiments of the present invention may require fewer components in comparison to conventional methods for reception of wireless power (i.e., connecting the antenna to a rectifier to convert RF power to DC and then regulating the DC using a switchmode or linear regulator).

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the exemplary embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the exemplary embodiments of the invention.

The various illustrative logical blocks, modules, and circuits described in connection with the exemplary embodiments disclosed herein may be implemented or performed with a general purpose processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the exemplary embodiments disclosed herein may be embodied directly in hardware, in a software module executed by a processor, or in a combination of the two. A software module may reside in Random Access Memory (RAM), flash memory, Read Only Memory (ROM), Electrically Programmable ROM (EPROM), Electrically Erasable Programmable ROM (EEPROM), registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary embodiments, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The previous description of the disclosed exemplary embodiments is provided to enable any person skilled in the art to make or use the present invention. Various modifications to these exemplary embodiments will be readily apparent to those skilled in the art, and the generic principles defined herein may be applied to other embodiments without departing from the spirit or scope of the invention. Thus, the present invention is not intended to be limited to the exemplary embodiments shown herein but is to be accorded the widest scope consistent with the principles and novel features disclosed herein.

What is claimed is:

1. A method for conveying energy from a wireless power receiver to a load, the method comprising:

during a charging phase for storing energy, actuating a first switching element to couple a first terminal of a receive antenna receiving wireless power to a reference voltage and actuating a second switching element to couple a second terminal of the receive antenna to the reference voltage, the receive antenna located in a coupling-mode region of a transmit antenna and receiving the wireless power from the transmit antenna while operatively coupled with the transmit antenna; and during an output phase for transferring the energy from the receive antenna to an output coupled to the load, actuating only one of the first switching element or the second switching element to decouple only one of the first terminal or the second terminal from the reference voltage.

2. The method of claim 1, further comprising, during the output phase, coupling the first terminal to the output while the second terminal is coupled to the reference voltage.

3. The method of claim 2, further comprising, during another output phase, coupling the second terminal to the output while the first terminal is coupled to the reference voltage.

4. The method of claim 1, wherein the receive antenna receives wireless power at an inductor having one terminal coupled to a first capacitor and a second terminal coupled to a second capacitor.

5. The method of claim 1, further comprising sensing a current in each terminal of the receive antenna.

6. The method of claim 1, further comprising, during the output phase, coupling the first terminal to the output upon a current in the second terminal exceeding a threshold current level.

7. The method of claim 1, wherein the first switching element comprises at least one first transistor and the second switching element comprises at least one second transistor.

8. The method of claim 7, wherein the at least one first transistor comprises a first pair of transistors that are actuated in opposite phase to one another and the at least one second transistor comprises a second pair of transistors that are actuated in opposite phase to one another.

9. The method of claim 1, further comprising conveying energy from the output to a battery of an electronic device.

10. A method for conveying energy from a wireless power receiver to a load, the method comprising:
coupling each of a first terminal and a second terminal of a receive antenna to a reference voltage while the receive antenna is wirelessly receiving energy from a transmit antenna for storing;
decoupling one of the first terminal or the second terminal of the receive antenna from the reference voltage and coupling the one of the first terminal or the second terminal of the receive antenna to an output while the other of the first terminal or the second terminal of the receive antenna is coupled to the reference voltage during an output phase for transferring stored energy from the receive antenna to the output; and
decoupling the other of the first terminal or the second terminal of the receive antenna from the reference voltage and coupling the other of the first terminal or the second terminal of the receive antenna to the output while the one of the first terminal or the second terminal of the receive antenna is coupled to the reference voltage during another output phase for transferring stored energy from the receive antenna to the output.

11. The method of claim 10, wherein coupling each of the first terminal and the second terminal of the receive antenna to the reference voltage comprises selectively coupling the first terminal of the receive antenna to the reference voltage via a first switching element and selectively coupling the second terminal of the receive antenna to the reference voltage via a second switching element.

12. The method of claim 11, further comprising sensing a voltage drop across at least one of the first switching element and the second switching element.

13. The method of claim 11, wherein coupling one of the first terminal or the second terminal of the receive antenna to the output during the output phase comprises coupling the first terminal to the output via a third switching element in response to a voltage drop across the one of the first switching element or the second switching element being sufficiently high.

14. The method of claim 13, wherein coupling the other of the first terminal or the second terminal of the receive antenna to the output during another output phase comprises selectively decoupling the second terminal from the reference voltage and coupling the second terminal to the output via a fourth switching element.

15. The method of claim 11, wherein coupling one of the first terminal or the second terminal of the receive antenna to the output during the output phase comprises selectively decoupling the first terminal from the reference voltage and coupling the first terminal to the output via a third switching element.

16. The method of claim 11, further comprising sensing a current through at least one of the first terminal or the second terminal.

17. A receiver for conveying energy from a transmitter to a load, the receiver located in a coupling-mode region of a transmit antenna of the transmitter, the receiver comprising:
a receive antenna; and
a plurality of switching elements comprising:
at least one switching element configured to selectively couple or decouple a first terminal of the receive antenna to or from an output and to or from a reference voltage; and
at least one other switching element configured to selectively couple or decouple a second terminal of the receive antenna to or from the output and to or from the reference voltage, the at least one switching element and the at least one other switching element operable independently of one another.

18. The receiver of claim 17, wherein the at least one other switching element is responsive to a current flowing between ground and the first terminal and the at least one switching element is responsive to another current flowing between ground and the first terminal.

19. The receiver of claim 17, wherein the receive antenna comprise a one-turn inductor coupled between matching capacitors.

20. The receiver of claim 17, wherein each switching element of the plurality of switching elements comprises a transistor.

21. The receiver of claim 17, wherein the receive antenna is configured to operate at a frequency suitable for at least one of electric vehicle charging or inductive coupling.

22. The receiver of claim 17, further comprising a first current sense comparator configured to compare a current through the first terminal of the receive antenna to a threshold current and a second sense comparator configured to compare a current through the second terminal of the receive antenna to the threshold current.

23. A device for conveying energy from a transmitter to a load, the device located in a coupling-mode region of a transmit antenna of the transmitter, the device comprising:
a receive antenna including first and second terminals, wherein each of the first and second terminals of the receive antenna is coupled to a reference voltage during a charging phase for storing energy;
a first current sense comparator configured to compare a current through the first terminal of the receive antenna with a threshold current; and
a plurality of switching elements, wherein at least one switching element is configured to selectively couple the second terminal of the receive antenna to an output when the current through the first terminal of the receive antenna is greater than the threshold current.

24. The device of claim 23, wherein the first current sense comparator is configured to compare a current through a positive terminal of the receive antenna to the threshold current.

25. The device of claim 23, further comprising a second current sense comparator is configured to compare a current through the second terminal of the receive antenna with the threshold current, and at least one other switching element is configured to selectively couple the first terminal of the receive antenna to the output when the current through the second terminal of the receive antenna is greater than the threshold current.

26. The device of claim 23, wherein the first current sense comparator is configured to convey a first control signal to the at least one switching element of the plurality of switching elements to decouple the second terminal of the receive antenna from a reference voltage and a second control signal to the at least one switching element of the plurality of switching elements to couple the second terminal of the receive antenna to the output.

27. The device of claim 23, wherein the output is coupled to a battery of an electronic device.

28. A device for conveying energy from a transmitter to a load, the device located in a coupling-mode region of a transmit antenna of the transmitter, the device comprising:

means for receiving wireless power including first and second terminals;

means for coupling each of the first and second terminals of the means for receiving wireless power to a reference voltage during a charging phase for storing energy; and means for decoupling the first terminal of the means for receiving wireless power from the reference voltage and coupling the first terminal to an output during an output phase for transferring energy from the means for receiving wireless power to the output while the second terminal of the means for receiving wireless power is coupled to the reference voltage; and means for decoupling the second terminal from the reference voltage and coupling the second terminal to the output during another output phase for transferring energy from the means for receiving wireless power to the output while the first terminal is coupled to the reference voltage.

29. The device of claim 28, wherein the means for decoupling the first terminal from the reference voltage and coupling the first terminal to the output is operable independently of the means for decoupling the second terminal from the reference voltage and coupling the second terminal to the output.

30. The device of claim 28, further comprising means for sensing a current in each of a positive terminal of the means for receiving wireless power and a negative terminal of the means for receiving wireless power.

31. A device for conveying energy from a transmitter to a load, the device located in a coupling-mode region of a transmit antenna of the transmitter, the device comprising:

means for receiving wireless power including first and second terminals;

means for coupling each of the first and second terminals of the means for receiving wireless power to a reference voltage while receiving energy therewith for storing energy;

first means for coupling one of the first terminal or the second terminal of the means for receiving wireless power to an output during an output phase for transferring energy from the means for receiving wireless power to the output; and second means for coupling the other of the first terminal or the second terminal of the means for receiving wireless power to the output during another output phase for transferring energy from the means for receiving wireless power to the output, the first means and the second means operable independently from one another.

32. The device of claim 31, further comprising means for selectively coupling the first terminal of the means for receiving wireless power to the reference voltage via a first switching element and selectively coupling the second terminal of the means for receiving wireless power to the reference voltage via a second switching element.

33. The device of claim 31, further comprising means for comparing a current through at least one of the first terminal or the second terminal to a threshold current.

* * * * *

UNITED STATES PATENT AND TRADEMARK OFFICE
CERTIFICATE OF CORRECTION

PATENT NO. : 8,878,394 B2  
APPLICATION NO. : 12/909747  
DATED : November 4, 2014  
INVENTOR(S) : Linda Stacey Irish Page 1 of 1

It is certified that error appears in the above-identified patent and that said Letters Patent is hereby corrected as shown below:

In the Claims

In column 11 at line 34, In Claim 10, change "storing;" to --storing energy;--.

In column 13 at line 6, In Claim 25, change "comparator is" to --comparator--.

Signed and Sealed this  
Thirtieth Day of June, 2015

Michelle K. Lee  
*Director of the United States Patent and Trademark Office*